Aug. 10, 1926.
E. F. HULBERT
METHOD OF MAKING FIBER CONTAINER CLOSURES
Filed Oct. 23, 1925
1,595,304
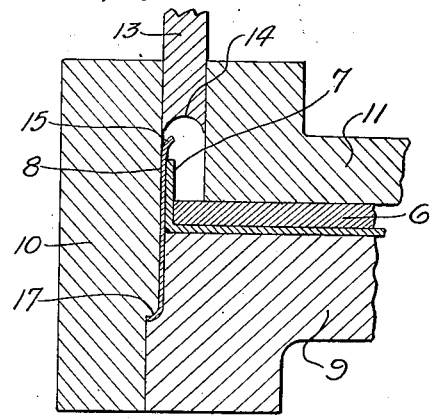
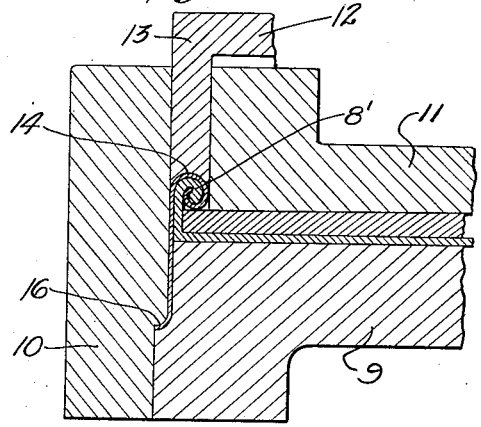
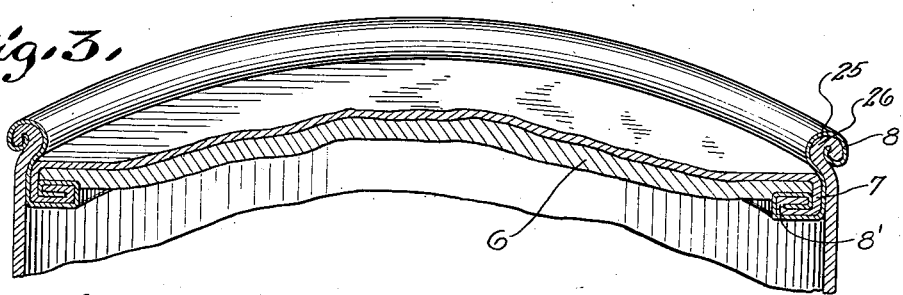
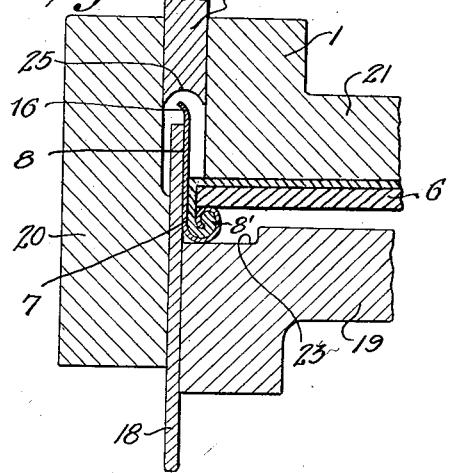
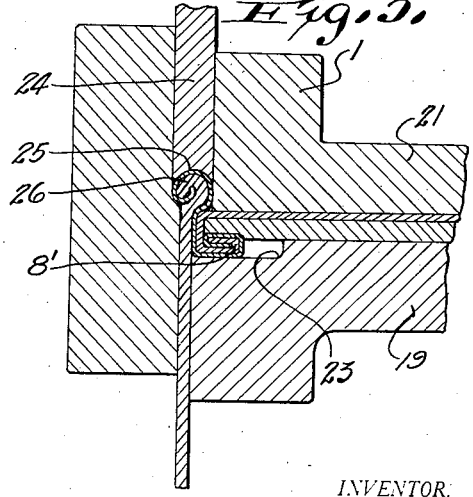
INVENTOR.
Edwin F. Hulbert
BY
Juarles & French
ATTORNEYS Patented Aug. 10, 1926.

1,595,304

UNITED STATES PATENT OFFICE.

EDWIN F. HULBERT, OF MILWAUKEE, WISCONSIN, ASSIGNOR, BY MESNE ASSIGNMENTS, TO THE MASTER PACKAGE CORPORATION, OF DELAWARE.

METHOD OF MAKING FIBER-CONTAINER CLOSURES.

Application filed October 23, 1925. Serial No. 64,472.

The invention relates to a method of making fiber container closures.

The object of the invention is to provide a container closure having a dished head with a metal band clamped to the siding of the container and to the bottom portion of the head and projecting with the siding over the outer portion of the head, and to provide a method for expeditiously making this closure.

The invention further consists in the several features hereinafter set forth and more particularly defined by claims at the conclusion hereof.

In the drawings, Fig. 1 is a detail sectional view through the head parts of the container, before assembly;

Fig. 2 is a similar view of the head parts after assembly;

Fig. 3 is an elevation view, partly in section, of the finished closure;

Fig. 4 is a view similar to Fig. 3, showing the final position of the assembled head and siding;

Fig. 5 is a detail sectional view showing the initial position of the head and siding.

Referring to Figs. 1 and 2, the head structure is formed by a dished laminated fiber head 6 having one or more of its laminations bent up to form an annular flange 7 and a band 8 of thin sheet-metal is first secured to this head by bending it and the flange 7 into a beaded edge 8' against the head through the interaction of an internal expanding chuck 9, an external contracting chuck 10, a clamping plunger 11 and a forming plunger 12 having an annular part 13 provided with a curved edge 14.

As shown in Figs. 1 and 2, the band 8, with a slightly inwardly-curved upper edge 15, has the head fitted within it and is clamped between the chucks 9 and 10 and the head between the chuck 9 and the plunger 11, after which the plunger 12 is moved downwardly to the position shown in Fig. 2 to secure the parts together as above described, and at the same time the lower edge 16 of the band is curved outwardly by being forced into an annular curved space 17 formed between the chucks.

The head thus formed is inserted within the fiber tubing 18 forming the siding of the body or cover of the container which is held between an internal expanding chuck 19 and an external contracting chuck 20, and a clamping plunger 21 then moves down against the head and forces it against the chuck 19, thereby flattening the beaded edge 8 down into an annular recess 23 in the chuck 19, and a forming plunger 24, similar to the plunger 12, with a curved edge 25, is moved down to roll the band with the free end of the siding into a beaded edge 26 between said edge 25, the chuck 20, and the plunger 21, and this rolled edge extends to some extent over the head so that parts of the band act on opposite sides of the head to clamp it firmly in place as shown in Fig. 3.

I desire it to be understood that this invention comprehends such variations from the specific disclosure as fall within the scope of the appended claims.

What I claim as my invention is:

1. The method of forming a fiber container which consists in attaching a metal band to the outwardly-extending flange of a dished head by bending said flange and an edge portion of the band over against the head in the form of a bead, inserting this head structure into the siding so that the other part of the band extends with a part of the siding beyond the head, then bending the extended parts of the band and siding into crimped engagement with each other and against the outer edge of the head.

2. The method of forming a fiber container which consists in attaching a metal band to the outwardly-extending flange of a dished head by bending said flange and an edge portion of the band over against the head in the form of a bead, inserting this head structure into the siding so that the other part of the band extends with a part of the siding beyond the head, then bending the extended parts of the band and siding into crimped engagement with each other adjacent the bead and flattening said head between the band and said flange, against the inner side of the head.

In testimony whereof, I affix my signature.

EDWIN F. HULBERT.